United States Patent
Takeda et al.

(10) Patent No.: US 9,969,250 B2
(45) Date of Patent: May 15, 2018

(54) SEALING MEMBER OF DOOR FOR CAR

(71) Applicant: Nishikawa Rubber Co., Ltd., Hiroshima (JP)

(72) Inventors: Kazuyuki Takeda, Hiroshima (JP); Atushi Fukuta, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days. days.

(21) Appl. No.: 15/169,237

(22) Filed: May 31, 2016

(65) Prior Publication Data

US 2017/0001504 A1    Jan. 5, 2017

(30) Foreign Application Priority Data

Jun. 30, 2015   (JP) .................................. 2015-131139

(51) Int. Cl.
    *B60J 10/27*    (2016.01)
    *B60R 13/04*    (2006.01)
    *B60J 10/76*    (2016.01)

(52) U.S. Cl.
    CPC ............... *B60J 10/27* (2016.02); *B60J 10/76* (2016.02); *B60R 13/04* (2013.01)

(58) Field of Classification Search
    CPC ............ B60J 10/23; B60J 10/26; B60J 10/27
    See application file for complete search history.

(56) References Cited

U.S. PATENT DOCUMENTS

| | | | | |
|---|---|---|---|---|
| 4,950,019 | A * | 8/1990 | Gross ..................... | B60J 10/265 296/201 |
| 5,317,835 | A * | 6/1994 | Dupuy .................. | B60J 10/235 49/377 |
| 5,743,047 | A * | 4/1998 | Bonne ..................... | B60J 10/00 49/441 |
| 6,070,364 | A * | 6/2000 | Berry .................... | B60J 10/235 49/441 |
| 6,968,649 | B2 * | 11/2005 | Van Den Oord ...... | B60J 10/248 49/490.1 |
| 7,478,863 | B2 * | 1/2009 | Krause ..................... | B60J 10/79 296/1.08 |
| 8,205,389 | B1 * | 6/2012 | Kesh ..................... | B60J 10/235 49/440 |
| 8,479,449 | B2 * | 7/2013 | Titz .......................... | B60J 10/78 49/440 |
| 9,027,284 | B2 * | 5/2015 | Murree ................. | E06B 7/2314 49/441 |
| 9,623,739 | B2 * | 4/2017 | Fukuta .................... | B60J 10/32 |

(Continued)

FOREIGN PATENT DOCUMENTS

JP    2012-131304 A    7/2012

*Primary Examiner* — Katherine W Mitchell
*Assistant Examiner* — Catherine A Kelly
(74) *Attorney, Agent, or Firm* — Alston & Bird LLP

(57) ABSTRACT

When an insertion groove, into which various parts are inserted, is formed on a sealing member, the present disclosure may maintain a width of an opening of the insertion groove greater than or equal to a predetermined width, facilitating the insertion. A sealing member 30 includes an insertion groove S into which a trim strip 45 is inserted. The insertion groove S has a side face S1 provided with a protruding portion 41c. The protruding portion 41c protrudes toward another side face S2 and abuts on the other side face S2 to set an opening width of the insertion groove S to a predetermined opening width or wider.

7 Claims, 9 Drawing Sheets

OUTSIDE OF COMPARTMENT ←    → INSIDE OF COMPARTMENT

(56) References Cited

U.S. PATENT DOCUMENTS

2008/0030046 A1\* 2/2008 Krause ................... B60J 10/79
 296/146.2
2013/0292965 A1\* 11/2013 Prater ................. B60J 10/0091
 296/146.2
2017/0001503 A1\* 1/2017 Morioka ................. B60J 10/27

\* cited by examiner

OUTSIDE OF COMPARTMENT ← → INSIDE OF COMPARTMENT

OUTSIDE OF COMPARTMENT ← → INSIDE OF COMPARTMENT

OUTSIDE OF COMPARTMENT ← → INSIDE OF COMPARTMENT

OUTSIDE OF COMPARTMENT ← → INSIDE OF COMPARTMENT

SEALING MEMBER OF DOOR FOR CAR

CROSS-REFERENCE TO RELATED APPLICATION

This application claims priority to Japanese Patent Application No. 2015-131139 filed on Jun. 30, 2015, the disclosure of which including the specification, the drawings, and the claims are hereby incorporated by reference in its entirety.

BACKGROUND

The present disclosure relates to a sealing member provided to a door for a car and, in particular, belongs to a technical field of a construction which involves insertion of various kinds of parts such as a trim strip and a door flange.

Doors provided to a side of a car include a door having a window frame holding an edge portion of a window glass, and a door having no window frame; that is, a door having a frameless window. The door having the window frame is provided with a sealing member for sealing a gap between the edge portion of the window frame and an edge portion of an opening portion of the body of the car.

A known example of the construction of the door with this kind of window frame is disclosed in Japanese Unexamined Patent Publication No. 2012-131304. The window frame in the patent publication has an upper frame portion extending along a roof of the body. The upper edge portion is provided with a door flange protruding toward the outside of the compartment. The door flange has a sealing member provided from the outside of the compartment to cover the door flange. Such a construction—the sealing member is provided from the outside of the compartment to cover up the door flange on the upper frame portion—is referred to as a "hidden type".

The sealing member disclosed in the patent publication includes an insertion groove opening toward the outside of the compartment, and continuously formed from a front portion toward a rear portion of the upper frame portion. The insertion groove receives a securing leg of a trim strip so that the trim strip is secured to the sealing member.

Moreover, the door flange, also formed on the door other than the trim strip, is inserted into the sealing member of the door for the car. Insertion of this door flange allows the sealing member to be secured to the door.

Moreover, as disclosed in the patent publication, an elongated trim strip is secured between the front portion and the rear portion of the upper frame portion in order to improve the appearance of the window frame of the door. Here, a manufacturing challenge is how to secure the trim strip to the hidden-type sealing member.

Here, typically, the window frame of a front door for the car has an upper edge portion formed to bend round such that the upper edge portion is positioned lower as extending further toward the front. Consequently, the upper edge portion is shaped to have a bent portion. Meanwhile, the sealing member is shaped liner. When secured to the upper edge portion of the window frame, this liner-shaped sealing member is forcibly bent to fit into the shape of the bent portion of the upper edge portion. Here, the sealing member cannot conform to the difference between an outer peripheral length and an inner peripheral length of the bent portion of the upper edge portion. The resulting sealing member is forcibly bent. Forcibly bending the sealing member inevitably closes an opening of an insertion groove into which the sealing member is inserted. As a result, the closed opening causes a problem; that is, inserting the securing leg of the trim strip becomes difficult, followed by degrading workability when the trim strip is fastened to the sealing member.

Moreover, when the door flange is inserted, the sealing member has to be bent and secured as described above. Thus, the problem is that the opening of the insertion groove is closed and, as a result, inserting the door flange can be difficult.

Furthermore, the insertion groove of the sealing member could possibly be closed on its own even in a non-bent portion of the sealing member. This case also makes it difficult to insert various kinds of parts into the insertion groove.

The present disclosure is conceived in view of the above problems. When an insertion groove, into which various parts are inserted, is formed on a sealing member, the present disclosure successfully maintains a width of an opening of the insertion groove greater than or equal to a predetermined width and provides high workability in the insertion.

SUMMARY

In the present disclosure, an insertion groove, into which various parts are inserted, is formed on a sealing member. An opening width setting portion is provided to protrude from one of side faces of the insertion groove.

A first aspect of the present disclosure is directed to a sealing member to be secured to a door for a car. The sealing member includes an insertion groove, formed on the sealing member, into which a part is inserted; and an opening width setting portion provided to a side face of the insertion groove, protruding toward an other side face of the insertion groove, and abutting on the other side face to set a width of an opening of the insertion groove to a predetermined opening width or wider.

In accordance with these features, the opening width setting portion provided to the side face of the insertion groove abuts on the other side face of the insertion groove. Thus, when external force is applied to narrow the width of the opening of the insertion groove, the opening width setting portion may keep the width of the opening of the insertion groove from becoming narrower than the predetermined opening width. This opening width setting portion maintains the opening of the trim strip insertion groove to be open. As a result, various kinds of parts, such as a trim strip and door flange, may be easily inserted into the insertion groove.

In a second aspect of the present disclosure according to the first aspect, the opening width setting portion has a face away from a deepest end of the insertion groove, the face being formed to be positioned deeper into the insertion groove as extending toward a protruding end of the opening width setting portion.

In accordance with this feature, when various parts are inserted into the insertion groove of the sealing member, the opening width setting portion guides inserting tips of the various parts deeper into the insertion groove.

In a third aspect of the present disclosure according to the first aspect, the sealing member includes a portion made of an elastic material, and a core harder than the elastic material, and the core is provided with the opening width setting portion.

In accordance with these features, the opening width setting portion is provided to the core harder than the elastic material, which makes the opening width setting portion difficult to deform by external force. As a result, the opening width setting portion may reduce a risk in advance that the width of the opening of the insertion groove becomes narrower.

In a fourth aspect of the present disclosure according to the third aspect, the core is formed to fit onto a door flange provided to a window frame of the door while the door flange is inserted into the inserting groove.

In accordance with this feature, the core fits onto the door flange to become harder to deform and more rigid. The opening width setting portion is provided to this rigid core, which may reliably maintain the width of the opening of the insertion groove to be open.

In a fifth aspect of the present disclosure according to the first aspect, the sealing member being secured to the door flange, and covering up the door flange at least from an outside of a compartment of the car, the door flange protruding from the window frame of the door toward the outside of the compartment, wherein the insertion groove is formed to open toward the outside of the compartment, the part includes a trim strip having a securing leg to be inserted into the insertion groove from the outside of the compartment, and the opening width setting portion engages with an engaging step portion formed on the securing leg of the trim strip.

In accordance with these features, securing the sealing member to the door flange implements a door including a hidden-type sealing member. Then, when the securing leg of the trim strip is inserted in the sealing member, the opening width setting portion engages with the engaging step portion of the securing leg. Specifically, such engagement may effectively reduce a risk that the trim strip comes off the sealing member, using the opening width setting portion for maintaining the width of the opening of the insertion groove.

In a sixth aspect of the present disclosure according to the fifth aspect, the other side face of the insertion groove is provided with a protruding portion fitting on a fitting portion formed on the securing leg of the trim strip.

In accordance with this feature, the opening width setting portion and the protruding portion engage, from the respective side faces of the insertion groove, with the securing leg of the trim strip. This engagement makes both the opening width setting portion and the protruding portion difficult to disengage from the securing leg.

According to the first aspect, the opening width setting portion is provided to one of the side faces of the insertion groove. Such a feature may maintain the width of the opening of the insertion groove greater than or equal to a predetermined width, and provide high workability when various parts such as a trim strip are fastened.

According to the second aspect, the opening width setting portion has a face away from a deepest end of the insertion groove, the face being formed to be positioned deeper into the insertion groove as extending toward a protruding end of the opening width setting portion. Such a feature allows the tip of the securing leg of the trim strip to be guided deeper into the insertion groove, when the securing leg is inserted into the insertion groove. This contributes to smooth insertion of the securing leg.

According to the third aspect, the opening width setting portion is provided to the core. Such a feature makes the opening width setting portion difficult to deform, and successfully reduces the risk in advance that the width of the opening of the insertion groove becomes narrower.

According to the fourth aspect, the opening width setting portion is provided to the core that fits onto the door flange to achieve higher rigidity. Such a feature reliably maintains the width of the opening of the insertion groove.

According to the fifth aspect, the opening width setting portion engages with the engaging step portion formed on the securing leg of the trim strip. Such a feature may effectively reduce the risk that the trim strip comes off the sealing member, using the opening width setting portion for maintaining the width of the opening of the insertion groove.

According to the sixth aspect, the other side face of the insertion groove is provided with a protruding portion fitting on the fitting portion formed on the securing leg of the trim strip. Such a feature makes both the opening width setting portion and the protruding portion difficult to disengage, and thus may effectively reduce the risk that the trim strip comes off the sealing member.

DETAILED DESCRIPTION

Embodiments of the present disclosure will be described in detail below, with reference to the drawings. Note that the preferable embodiments below are essentially mere examples, and are not intended to limit the scopes of the present invention, of the application of the present invention, or of the use of the present invention.

(Configuration of Door)

Figure 1:
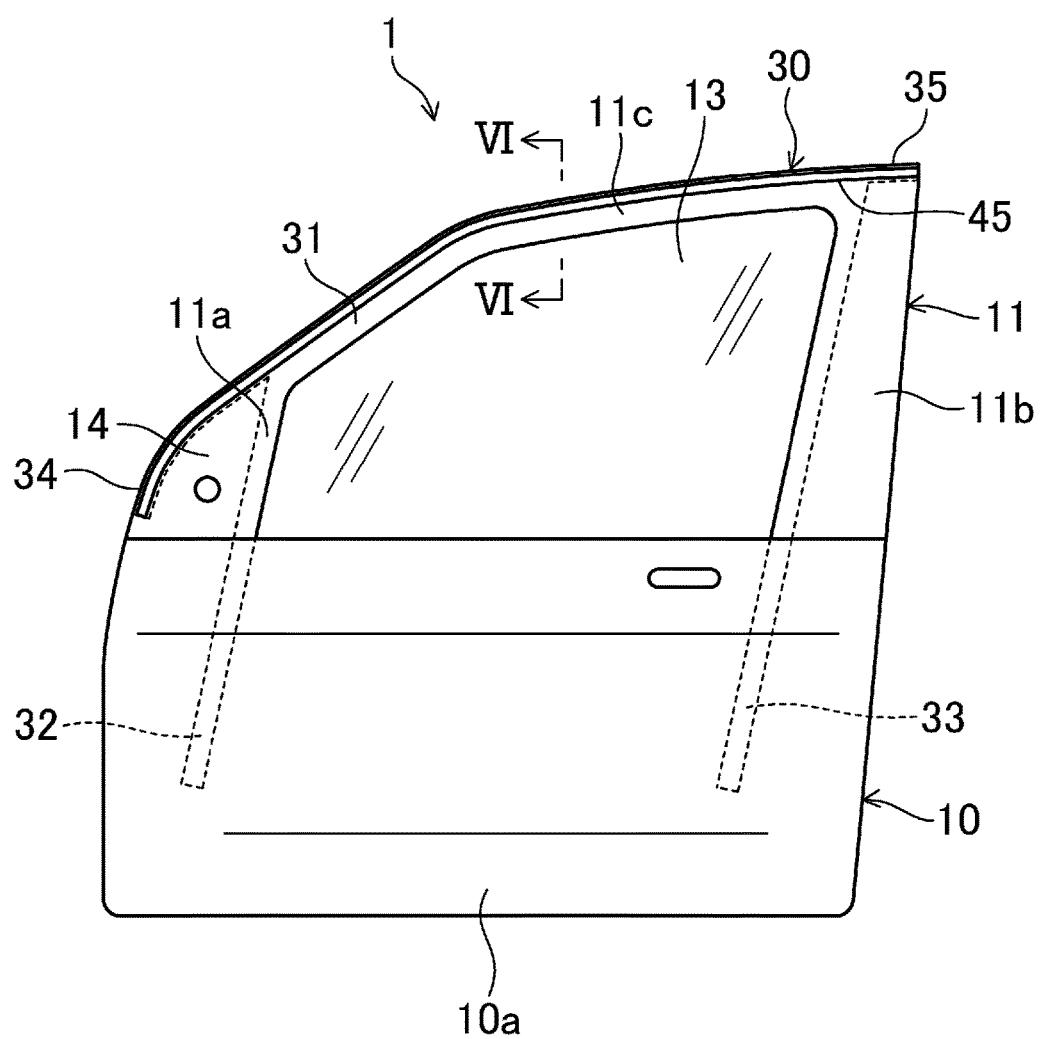
FIG. 1 is a side view of a front door, for a car, having a construction for securing a trim strip according to embodiments.
Figure 2:
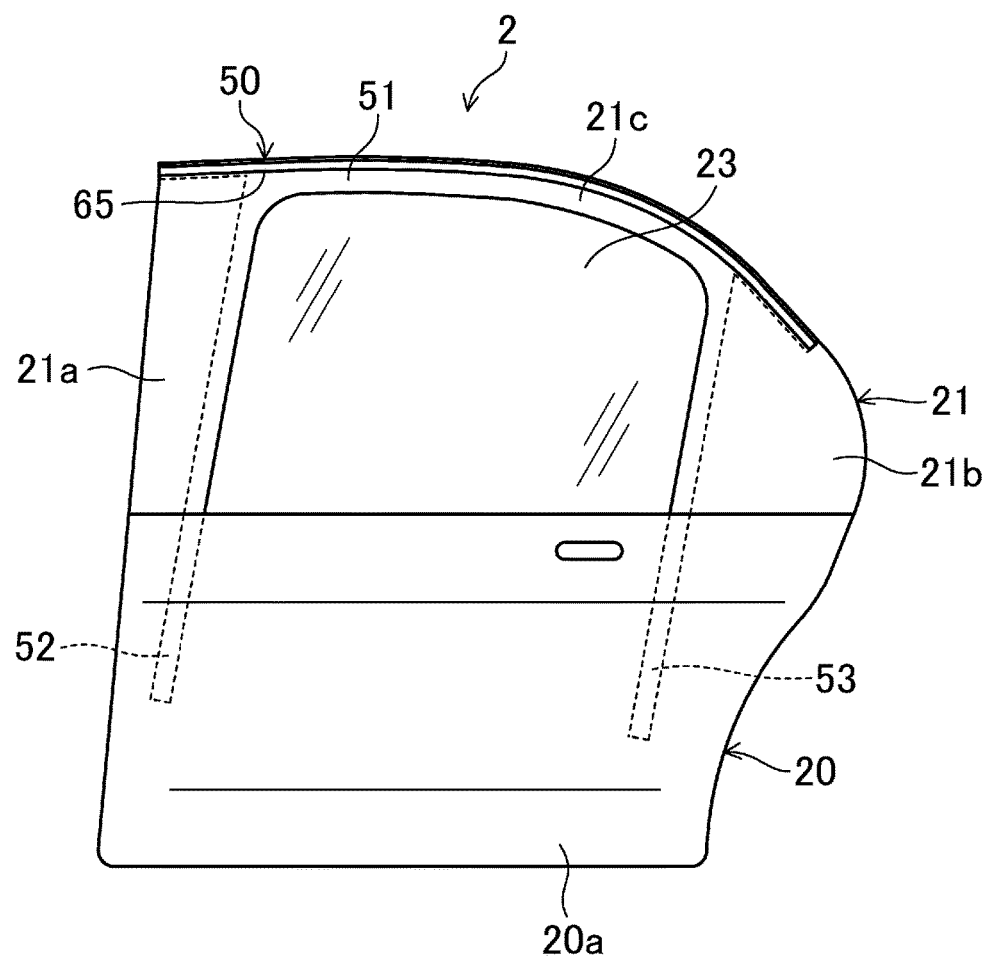
FIG. 2 is a side view of a rear door, for the car, having the construction for securing a trim strip according to the embodiments.

FIG. 1 is a side view of a front door 1, for a car, provided with a sealing member 30 for the door of the car, according to embodiments of the present disclosure. FIG. 2 is a side view of a rear door 2, for the car, provided with a sealing member 50 for the door of the car, according to the embodiments of the present disclosure. The front door 1 and the rear door 2 are arranged to a side of the car (not shown). The front door 1 opens and closes an opening portion (not shown) defined in the front, and to the side, of the car. The rear door 2 opens and closes an opening portion (not shown) defined in the rear, and to the side, of the car.

The front door 1 includes a door body 10 to be an approximately lower half of the front door 1, and a window frame 11 to be an approximately upper half of the front door 1. Even though not shown, a front end portion of the door body 10 is secured to a pillar of the car body via a hinge having a vertically extending rotational pin. The door body 10 includes an inner panel (not shown) and an outer panel 10a made of, for example, a steel plate. The door body 10 houses a window glass 13 which rises and falls, and a window regulator (not shown) to raise and lower the window glass 13.

Figure 7:
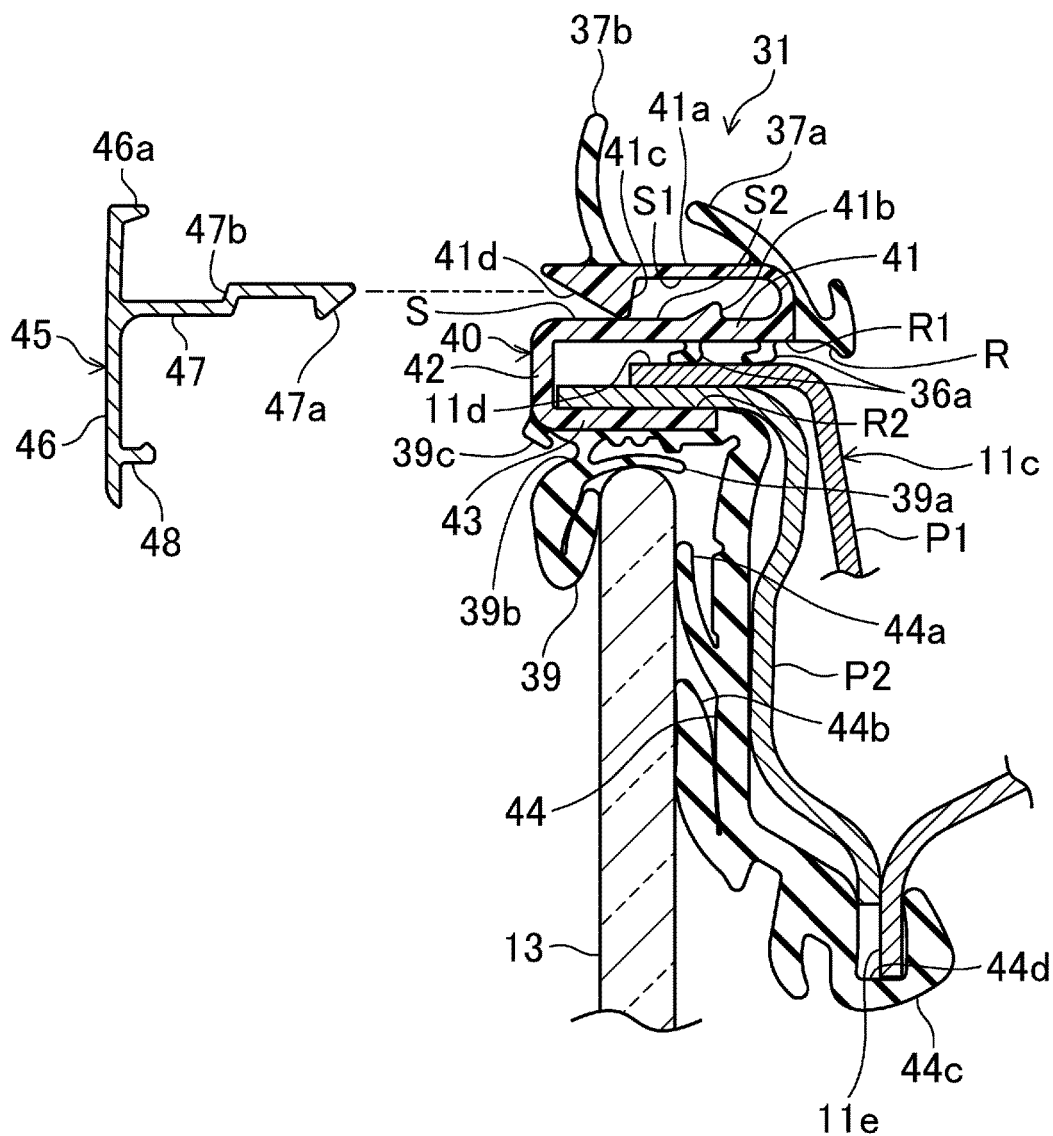
FIG. 7 is an illustration in FIG. 6 before the trim strip is secured.
Figure 8:
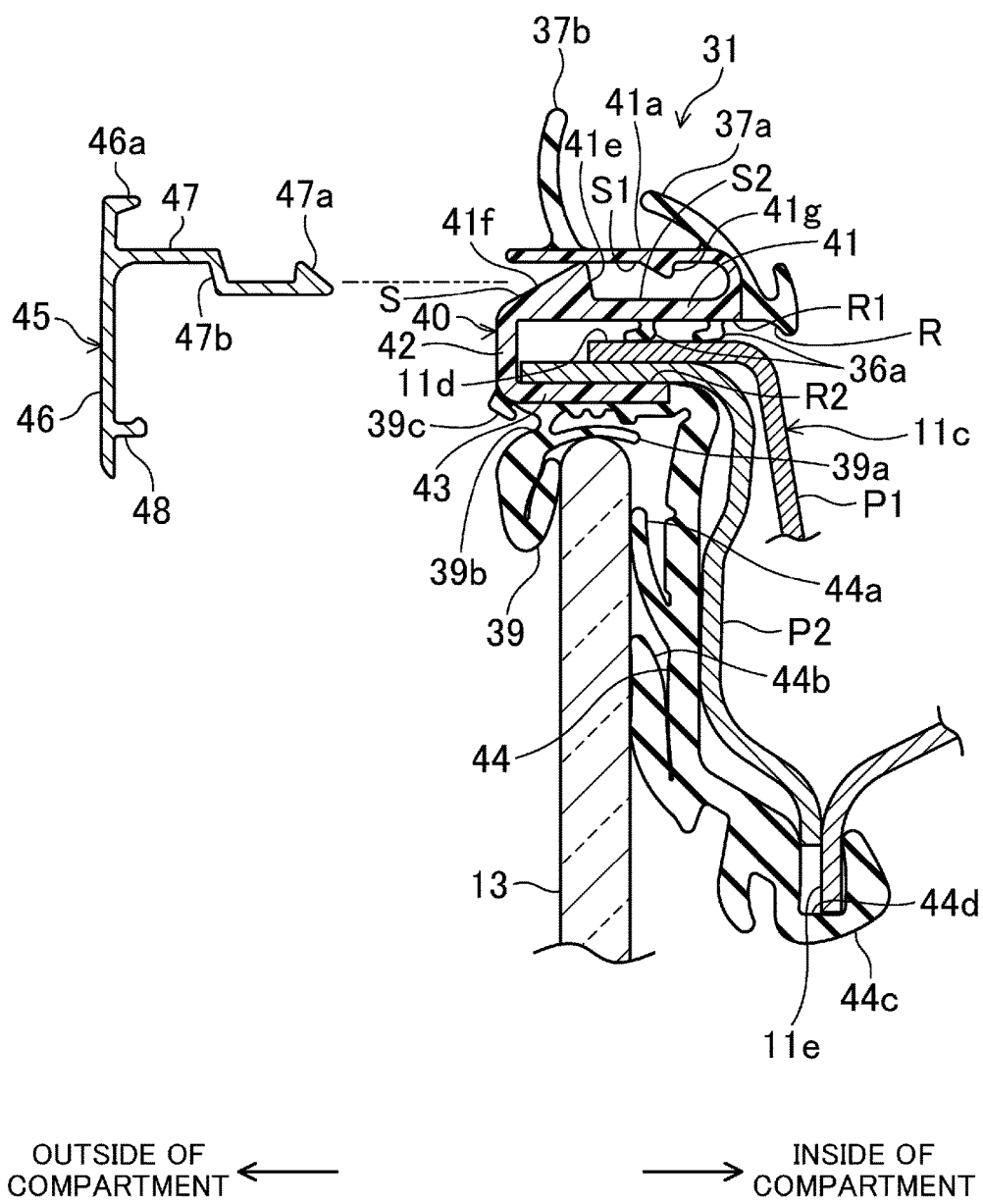
FIG. 8 is an illustration in FIG. 7 according a modified example 1 of the embodiments.

The window frame 11 functions as a sash to hold an edge portion of the window glass 13. As illustrated in FIG. 7, the window frame 11 according to these embodiments is a combination of a first panel member P1 and a second panel member P2 made of, for example, a pressed metal plate. However, the window frame 11 may be made by roll forming, for example.

As illustrated in FIG. 1, the window frame 11 includes a front longitudinal frame edge portion 11a, a rear longitudinal frame edge portion 11b, and a upper frame edge portion 11c. The front longitudinal frame edge portion 11a extends upward from an upper front edge of the door body 10. The rear longitudinal frame edge portion 11b extends upward from an upper rear edge of the door body 10. The rear longitudinal frame edge portion 11b extends above the front longitudinal frame edge portion 11a. The upper frame edge portion 11c extends between a top end of the front longitudinal frame edge portion 11a and a top end of the rear longitudinal frame edge portion 11b, in the front-rear direction along an edge portion (not shown) of a roof of the body.

In front of the front longitudinal frame edge portion 11a of the window frame 11, a door mirror securing portion 14 is provided to extend upward the door body 10. A not-shown door mirror is secured to the door mirror securing portion 14. An upper edge portion of the door mirror securing portion 14 is formed to lead to a front end portion of the upper frame edge portion 11c of the window frame 11. The upper end portion slopes downward as extending toward the front.

As illustrated in FIG. 7, a door flange 11d is provided to the upper frame edge portion 11c of the window frame 11, and protruding toward the outside of the compartment. Edge portions of the first panel member P1 and the second panel member P2, included in the window frame 11, are shaped to extend toward the outside of the compartment, and vertically overlap with each other to form the door flange 11d. In the door flange 11d, the edge portion of the first panel member P1 is positioned above the edge portion of the second panel member P2. Moreover, the edge portion of the first panel member P1 is positioned slightly more inwardly toward the compartment than the edge portion of the second panel member P2. However, the positioning of the edges shall not be limited to this. The front portion of the door flange 11d continuously extends to the front portion of the door mirror securing portion 14.

Furthermore, a sealing member fitting plate portion 11e is provided below the upper frame edge portion 11c to extend downward. Edge portions of the first panel member P1 and the second panel member P2, included in the window frame 11, are shaped to extend downward and overlap with each other in the inside-outside direction of the compartment to form the sealing member fitting plate portion 11e.

As illustrated in FIG. 1, the upper frame edge portion 11c is bent in the middle in the front-rear direction when seen from the side. Then, in the upper frame edge portion 11c, a portion before the bent portion slopes downward and extends toward the front. Moreover, in the frame upper edge portion 11c, a portion behind the bent portion slopes at a more obtuse angle than the sloping angle of the front portion and extends toward the bent portion. Note that the shape of the frame upper edge portion 11c shall not be limited to that illustrated in FIG. 1. The frame upper edge portion 11c may be bent round upward overall. The position of the bent portion and the sloping angle of the frame upper edge portion 11c may be set in any given manner so as to conform the shape of the roof of the body.

Figure 6:
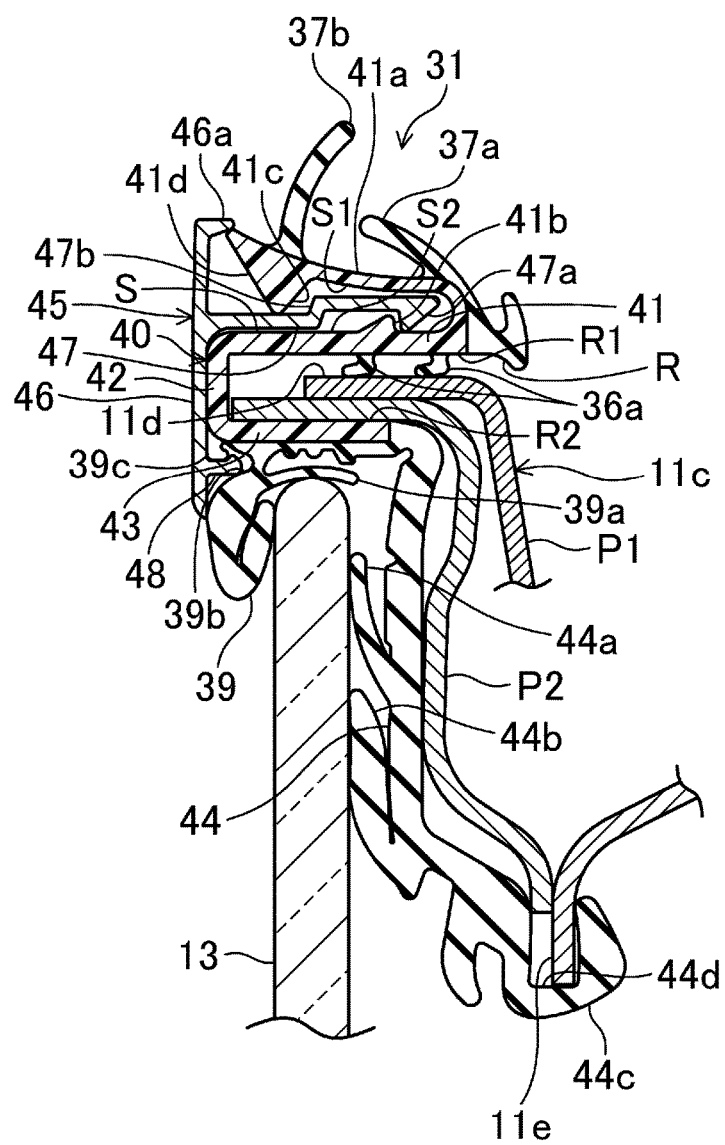
FIG. 6 is a cross-sectional view taken from line VI-VI of FIG. 1.

The door flange 11d is provided with the sealing member 30. Furthermore, as illustrated in FIG. 6, a trim strip 45 is secured to the sealing member 30 to be positioned outside the compartment with respect to the sealing member 30.

Figure 4:
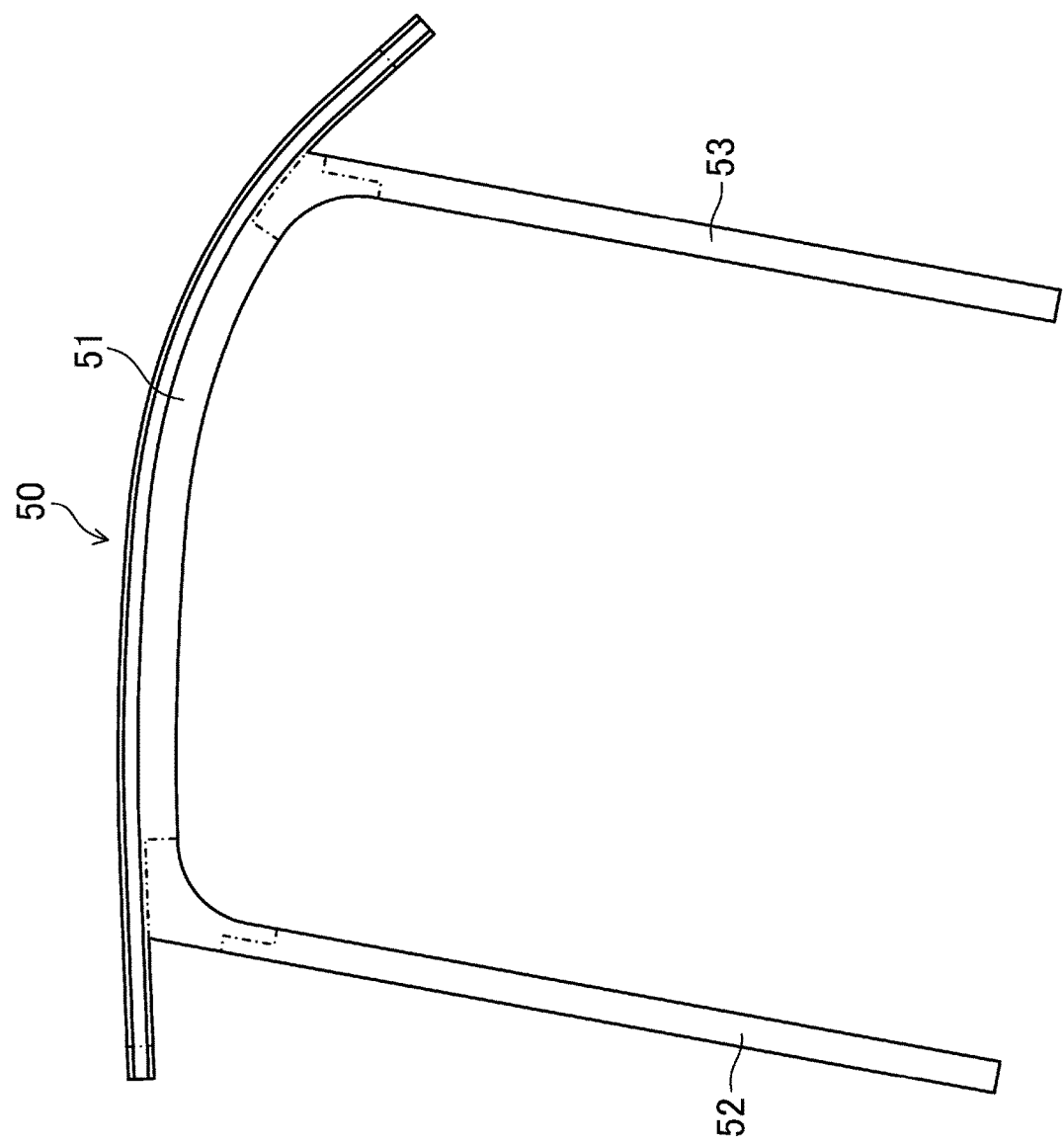
FIG. 4 is a side view of a sealing member provided to the rear door.
Figure 5:
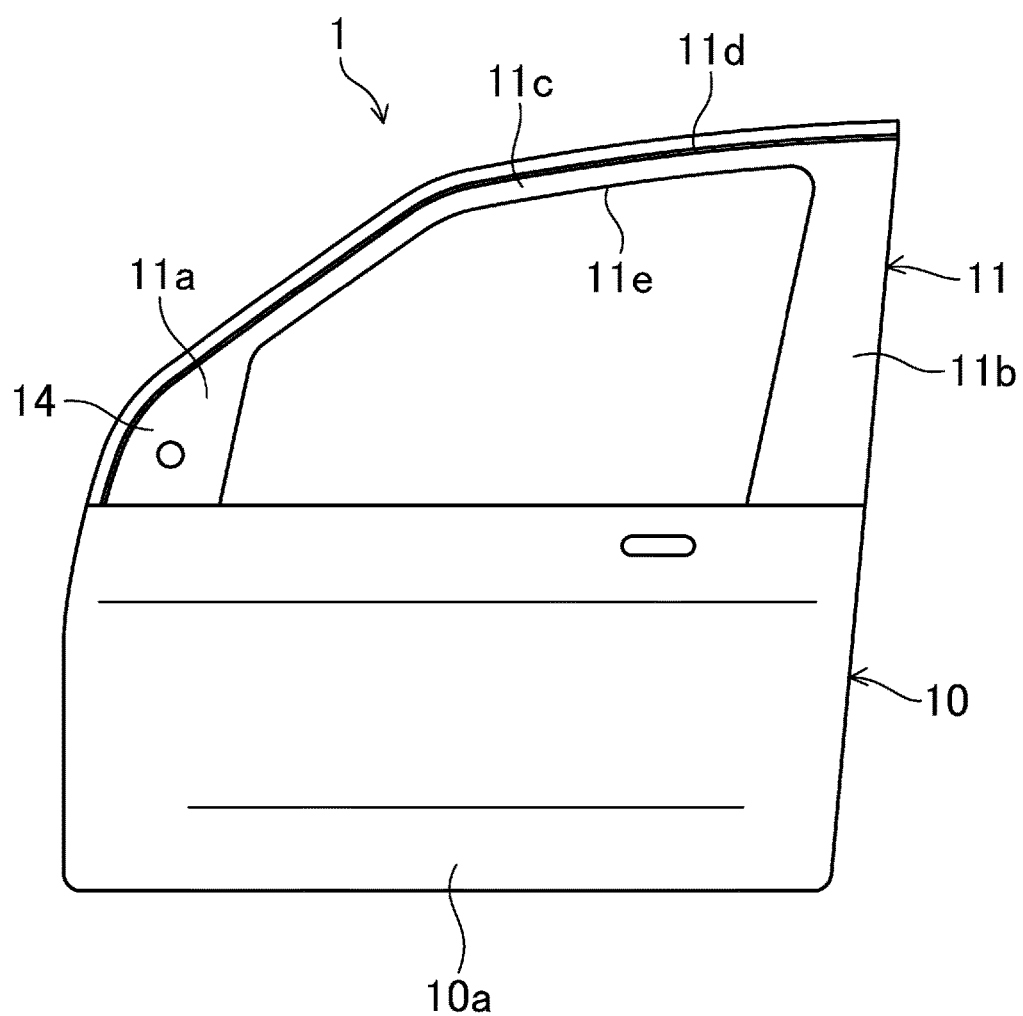
FIG. 5 is a side view of the front door with the sealing member and the trim strip removed.

Basically, the rear door 2 illustrated in FIG. 2 is the same in construction as the front door 1. Specifically, the rear door 2 includes a door body 20, and a window frame 21 holding an edge portion of a window glass 23. The window frame 21 includes a front longitudinal edge portion 21a, a rear longitudinal edge portion 21b, and an upper edge portion 21c. Then, as illustrated in FIG. 4, the rear door 2 is provided with a sealing member 50. The numerical reference 65 in FIG. 2 denotes a trim strip. The numerical reference 20a denotes an outer panel.

(Configuration of Sealing Member)

The sealing member 30 which is referred to as a "hidden type", is provided from the outside of the compartment to cover up the door flange 11d. The sealing member 30 is formed to cover up a top face and a bottom face of the door flange 11d. The sealing member 30 seals a gap between the edge portion of the window frame 11 and the edge portion of the opening portion of the body. The sealing member 30 also seals a gap between the edge portion of the window frame 11 and the edge portion of the window glass 13. The sealing member 30 includes a portion made of a waterproof elastic material such as ethylene-propylene-diene rubber (EPDM) and thermoplastic elastomer olefin (TPO), and a core 40 including a material different from the elastic material. The core 40 may be made of any given material which may include, but not specifically limited to, an aluminum alloy, steel, stainless steel, and hard resin such as resin in which talc and glass fibers are blended together.

Figure 3:
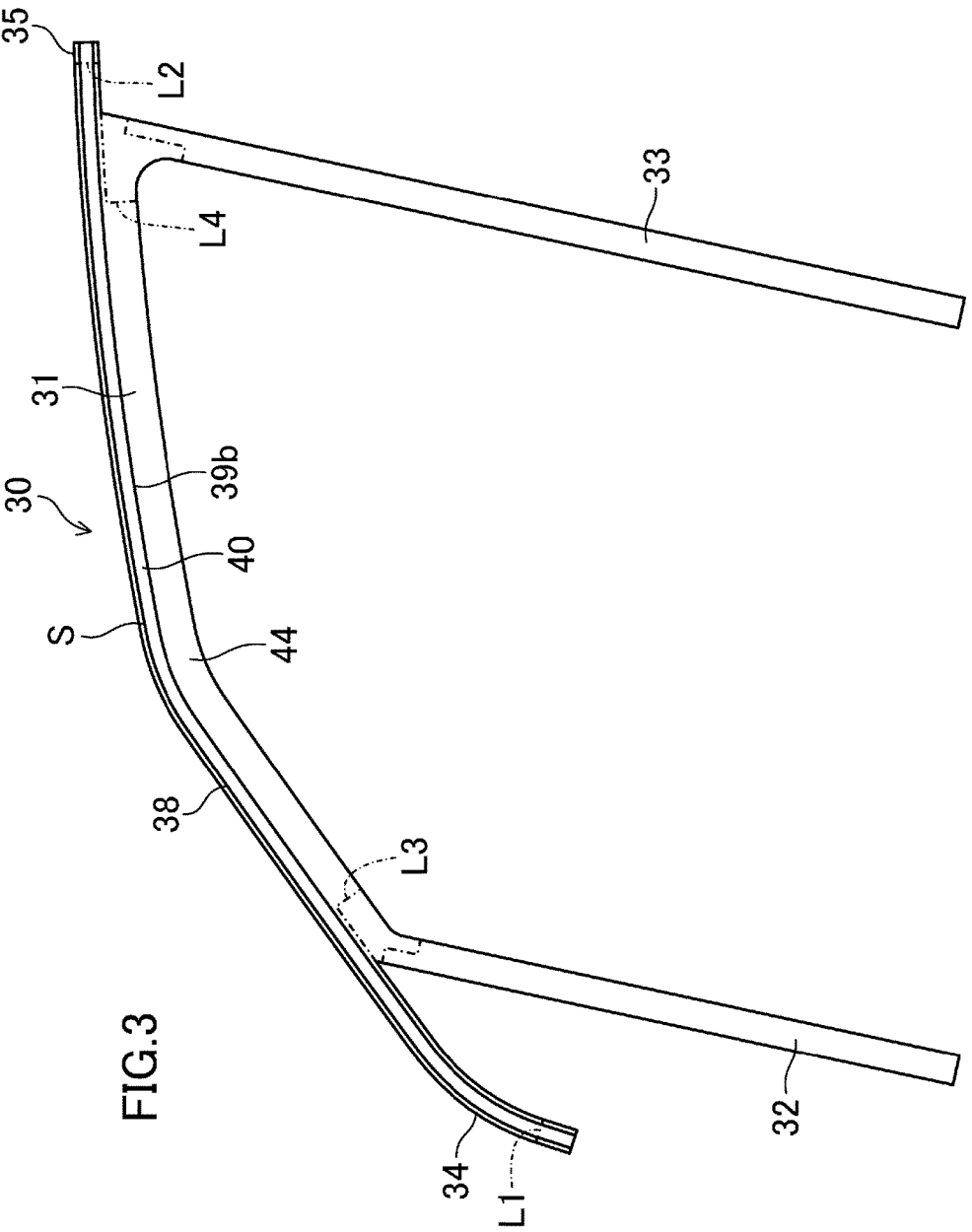
FIG. 3 is a side view of a sealing member provided to the front door.

As illustrated in FIG. 3, the sealing member 30 includes: an upper seal edge portion 31 extending along the upper frame edge portion 11c of the window frame 11; a front longitudinal seal edge portion 32 extending along the front longitudinal frame edge portion 11a of the window frame 11; and a rear longitudinal seal edge portion 33 extending along the rear longitudinal frame edge portion 11b of the window frame 11. The upper seal edge portion 31, the front longitudinal seal edge portion 32, and the rear longitudinal seal edge portion 33 are integrated into one.

Lower portions of the front longitudinal seal edge portion 32 and the rear longitudinal seal edge portion 33 extend into the door body 10 to be positioned near a lower portion of the door body 10 and held by a holding member (not shown) provided inside the door body 10. The front longitudinal seal edge portion 32 and the rear longitudinal seal edge portion 33 extend in the moving direction of the respective front edge portion and rear edge portion of the window glass 13 in rising and falling, so that the front edge portion and the rear edge portion of the window glass 13 are slidably in contact with the front longitudinal seal edge portion 32 and the rear longitudinal seal edge portion 33.

As illustrated in FIG. 3, a front seal portion 34 is continuously provided to the front portion of the upper seal edge portion 31 to extend before the front longitudinal seal edge portion 32. As illustrated FIG. 1, the front seal portion 34 is formed to extend along the upper edge portion of the door mirror securing portion 14. Furthermore, as illustrated in FIG. 3, a rear seal portion 35 is continuously provided to the rear portion of the upper seal edge portion 31 to extend behind the rear longitudinal seal edge portion 33.

The sealing member 30 is a combination of an extrusion-molded portion made by extrusion molding and a die-formed portion made by die forming. As illustrated in FIG. 3, there is a die-formed portion, in the front seal portion 34 of the sealing member 30, below a boundary L1 defined by a dashed-dotted line. Furthermore, there is another die-formed portion, in the rear seal portion 35 of the sealing member 30, behind a boundary L2 defined by a dashed-dotted line. Furthermore, there is another die-formed portion surrounded by a boundary L3 defined by a dashed-dotted line on the border between the upper seal edge portion 31 and the front longitudinal seal edge portion 32 of the sealing member 30. Furthermore, there is another die-formed portion surrounded by a boundary L4 defined by a dashed-dotted line on the border between the upper seal edge portion 31 and the rear longitudinal seal edge portion 33 of the sealing member 30. The extrusion-molded portion is other than the above two die-formed portions.

The upper seal edge portion 31 of the sealing member 30 has a cross-sectional shape as illustrated in FIG. 7. The cross-sectional shape is approximately the same the front end portion through the rear end portion of the upper seal edge portion 31; whereas, cross-sectional shapes of the front seal portion 34 and the rear seal portion 35 are different from the cross-sectional shape of the upper seal edge portion 31.

Specifically, the upper seal edge portion 31 includes a core 40 forming an upper portion of the upper seal edge portion 31 and a plate portion 44 extending downward from the core 40. The core 40 includes: a top plate portion 41 extending inside-outside direction of the compartment along the top face of the door flange 11d; a longitudinal plate portion 42 extending downward from an end portion, of the top plate portion 41, close to the outside of the compartment; and a bottom plate portion 43 extending toward the inside of the compartment along the bottom face of the door flange 11d. Furthermore, the top plate portion 41 has an end portion, to the inside of the compartment, provided with a protruding plate portion 41a protruding upward, and then bending and extending toward the outside of the compartment. The core 40 has an upper portion provided with a trim strip insertion groove S, and a lower portion provided with a door flange insertion groove R. The trim strip insertion groove S is defined by the top plate portion 41 and the protruding plate portion 41a, and open toward the outside of the compartment. The door flange insertion groove R is defined by the top plate portion 41, the longitudinal plate portion 42, and the bottom plate portion 43, and open toward the inside of the compartment.

When the door flange 11d is inserted into the door flange insertion groove R included in the lower portion of the core 40, the core 40 fits onto the door flange 11d to be fixed. In the fixed state, the top plate portion 41, the longitudinal plate portion 42, and the bottom plate portion 43 of the core 40 respectively cover up the top face, an outer end portion, and the bottom face of the door flange 11d. Furthermore, the trim strip 45 has a securing leg 47. When the securing leg 47 is inserted into the trim strip insertion groove S included in the upper portion of the core 40, as described below, the trim strip 45 is secured to the sealing member 30.

On a bottom face of the top plate portion 41 in the core 40, two protruding portions 36a, extending in a longitudinal direction of the upper seal edge portion 31, are formed at an interval in the inside-outside direction of the compartment. Made of an elastic material, the protruding portions 36a are flexible, and flex in contact with the door flange 11d while the core 40 fits onto the door flange 11d.

The protruding plate portion 41a of the top plate portion 41 in the core 40 is provided with an inner lip portion 37a and an outer lip portion 37b. The inner lip portion 37a bends round and extends toward the outside of the compartment from an end portion, of the protruding plate portion 41a, close to the inside of the compartment. The outer lip portion 37b bends round and extends upward from an end portion, of the protruding plate portion 41a, close to the outside of the compartment. When the front door 1 is closed, the inner lip portion 37a and the outer lip portion 37b provide a seal by making contact with the edge portion of the opening portion of the body.

Of the two side faces S1 and S2 of the trim strip insertion groove S, the side face S1 (one of the side faces) positioned above has a protruding portion (an opening width setting portion) 41c formed near the opening of the trim strip insertion groove S. The protruding portion 41c protrudes toward, and abuts on, the side face S2 (the other side face) positioned below so that a width of an opening of the trim strip insertion groove S is set to a predetermined opening width or wider.

The protruding portion 41c is integrally formed with the top plate portion 41 of the core 40, and made of a material harder than the elastic material. This makes the protruding portion 41c difficult to deform by external force. The predetermined opening width is approximately as wide as the thickness of a tip portion of the securing leg 47 in the trim strip 45, which will be described later. The predetermined opening width allows the tip portion of the securing leg 47 to be easily inserted into the opening of the trim strip insertion groove S. The predetermined opening width may be set to any given width, depending on a thing to be inserted, for example.

The protruding portion 41c has a face 41d positioned toward the opening (the outside of the compartment) of the trim strip insertion groove S. The face 41d slants to be positioned deeper (the inside of the compartment) into the trim strip insertion groove S, as extending toward a protruding end portion (downward) of the protruding portion 41c. The protruding portion 41c may be longitudinally formed across the both ends of the sealing member 30. The protruding portion 41c may be longitudinally and intermittently formed on the sealing member 30.

After the sealing member 30 is formed, the protruding tip portion of the protruding portion 41c may abut on the side face S2 provided in the lower portion of the trim strip insertion groove S. Once the sealing member 30 is formed, the protruding tip portion may be separated from the side face S2. Beneficially, however, the dimensions of the protruding tip portion of the protruding portion 41c may be set so that the protruding tip portion abuts on the side face S2 after the sealing member 30 is secured to the window frame 11.

A top face of the top plate portion 41 in the core 40 is provided with a fitting protrusion portion 41b positioned deeper into the trim strip insertion groove S than opening width setting portion 41c.

On a lower portion of the bottom plate portion 43 in the core 40, a glass contacting portion 39 is provided to extend downward. After extending downward, the glass contacting portion 39 is folded toward the inside of the compartment, and formed to have an approximate V-shaped cross section. When a tip of the glass contacting portion 39 makes contact with the edge portion of the window glass 13, a sealing effect is provided. Moreover, the glass contacting portion 39 has a base end portion provided with an extending plate portion 39a extending toward the inside of the compartment. This extending plate portion 39a also makes contact with the edge portion of the window glass 13.

On a lower portion of an exterior face of the glass contacting portion 39, a claw-receiving recessed portion 39b is formed to receive a securing claw 48, which is described later, of the trim strip 45. The claw-receiving recessed portion 39b has an interior surface provided with a hook portion 39c extending toward the inside of the claw-receiving recessed portion 39b. The securing claw 48 of the trim strip 45 is hooked over the hook portion 39c.

The plate portion 44, included in a lower portion of the upper seal edge portion 31, is integrally formed with the bottom plate portion 43 of the core 40 included in an upper portion of the upper seal edge portion 31. Instead of being integrally formed with the bottom plate portion 43, the plate portion 44 may be formed as a separate member and secured to the window frame 11. Note that the upper seal edge portion 31 may be either bent round as illustrated in FIG. 3 or formed liner.

The plate portion 44 is formed to cover, from the outside of the compartment, a portion of the upper frame edge portion 11c below the door flange 11d. The plate portion 44 has a face, to the outside of the compartment, provided with (i) an upper lip portion 44a formed in the vertical middle of the face and (ii) a lower lip portion 44b formed on a lower portion of the face. When the upper lip portion 44a and the lower lip portion 44b make contact with the edge portion of the window glass 13, sealing performance is provided.

On a lower portion of the plate portion 44, a protruding portion 44c is provided to extend downward. The protruding portion 44c has a fitting groove 44d formed to open upward. The sealing member fitting plate portion 11e of the upper frame edge portion 11c fits in the fitting groove 44d.

Meanwhile, as illustrated in FIG. 3, the front seal portion 34 and the rear seal portion 35 are not provided with the plate portion 44. Accordingly, the front seal portion 34 and the rear seal portion 35 are narrower in width than the upper seal edge portion 31.

Furthermore, as illustrated in FIG. 4, the sealing member 50 of the rear door 2 is similar in structure to the sealing member 30 of the front door 1, and includes a upper seal edge portion 51, a front longitudinal seal edge portion 52, and a rear longitudinal seal edge portion 53.

(Configuration of Trim Strip)

The trim strip 45 is secured so as to face the outside of the compartment with respect to the sealing member 30. The trim strip 45 is made of, for example, an aluminum alloy to give a metallic touch to the front door 1. Note that the trim strip 45 may also be made of resin. In such a case, a portion of the trim strip 45 facing the outside of the compartment may be plated or provided with a metallic plate so that the trim strip 45 looks metallic.

As illustrated in FIG. 1, the trim strip 45 is an elongated member extending the front end portion of the front seal portion 34 through the rear end portion of the rear seal portion 35 in the sealing member 30. As illustrated in FIGS. 6 and 7, the trim strip 45 includes: a body plate portion 46 extending along the exterior face of the longitudinal plate portion 42 of the core 40; the securing leg 47 protruding toward the inside of the compartment from an upper portion on an interior face, of the body plate portion 46, close to the compartment; and the securing claw 48 protruding toward the inside of the compartment from a lower portion of the interior face, of the body plate portion 46, close to the compartment. The body plate portion 46 has an upper edge portion provided with a bent portion 46a bent toward the inside of the compartment. In this bent portion 46a, an upper end portion of the core 40 is positioned.

The securing leg 47 is a portion to be inserted into the trim strip insertion groove S of the sealing member 30. The securing leg 47 is formed to extend so as to arrive close to a bottom portion of the trim strip insertion groove S when inserted. The securing leg 47 has a protruding tip portion (an inserting tip portion) provided with a fitting portion 47a The fitting portion 47a includes a protruding portion protruding downward from a bottom face of the securing leg 47. This fitting portion 47a hooks over the fitting protrusion portion 41b of the core 40 from the protruding tip portion, and engages with the fitting protrusion portion 41b.

Moreover, the securing leg 47 has a top face including an engaging step portion 47b recessed downward and formed in the middle, of the securing leg 47, along the protrusion. As illustrated in FIG. 6, the engaging step portion 47b fits to, and engages with, the securing leg 47 while the securing leg 47 is inserted into the trim strip insertion groove S.

As illustrated in FIG. 2, a trim strip 65 of the rear door 2 is similar in configuration to the trim strip 45 of the front door 1, and secured to the rear door 2. The trim strip 65 of the rear door 2 and the trim strip 45 of the front door 1 are continuously arranged with each other when seen from the side.

(How to Secure Sealing Member and Trim Strip)

Described next is how to secure the sealing member 30 and the trim strip 45. Described first is how to secure the sealing member 30. As illustrated in FIG. 7, in securing the sealing member 30 to the window frame 11, the sealing member 30 is placed outside the compartment with respect to the window frame 11. The opening portion of the door flange insertion groove R in the sealing member 30 is positioned opposite a tip portion of the door flange 11d in the window frame 11. After that, the tip portion of the door flange 11d is inserted into, and fit into, the door flange insertion groove R of the sealing member 30. In a similar manner, the front seal portion 34 of the sealing member 30 is secured to the door mirror securing portion 14, and the rear seal portion 35 is secured to an upper end portion of the rear longitudinal frame edge portion 11b. Lower portions of the front longitudinal seal edge portion 32 and the rear longitudinal seal edge portion 33 may be inserted later into the door body 10.

Moreover, the sealing member fitting plate portion 11e of the upper frame edge portion 11c is fitted into the fitting groove 44d provided to a lower portion of the sealing member 30, so that the plate portion 44 of the sealing member 30 is fixed to the window frame 11.

When secured to the window frame 11, the sealing member 30 is forcibly bent to fit into the shape of the bent portion of the frame upper edge portion 11c in the window frame 11. As a result, external force is applied to narrow the width of the opening of the trim strip insertion groove S. Here, the protruding portion 41c is formed on the side face S1 in the upper portion of the trim strip insertion groove S in the sealing member 30. When the tip portion of the protruding portion 41c abuts on the side face S2 in the lower portion of the trim strip insertion groove S, the opening width of the trim strip insertion groove S is set to a predetermined width or wider. Such a function keeps the width of the opening of the trim strip insertion groove S from narrowing, and maintains the opening of the trim strip insertion groove S to be open.

Accordingly, a worker may easily insert the securing leg 47 of the trim strip 45 into the maintained opening of the trim strip insertion groove S in the sealing member 30. When the securing leg 47 of the trim strip 45 is inserted into the opening of the trim strip insertion groove S and pressing force is applied along the insertion, the securing leg 47 presses the face 41d of the protruding portion 41c. This pressing force causes the core 40 to elastically deform so that the protruding portion 41c is displaced upward. Such a feature reduces a risk that the protruding portion 41c blocks the insertion of the securing leg 47 of the trim strip 45.

When the securing leg 47 of the trim strip 45 is thoroughly inserted, the fitting portion 47a hooks over and fits onto the fitting protrusion portion 41b of the core 40 from the protruding tip. Moreover, the protruding portion 41c fits onto and engages with the engaging step portion 47b. Furthermore, when the securing claw 48 of the trim strip 45 is inserted into the claw-receiving recessed portion 39b of the sealing member 30, the securing claw 48 of the trim strip 45 hooks over the hook portion 39c. This makes the trim strip 45 difficult to come off.

Effects of First Embodiment

As can be seen, the sealing member 30 according to this embodiment includes the protruding portion 41c provided to the side face S1 in the upper portion of the trim strip insertion groove S. Such a feature may reliably set the opening width of the trim strip insertion groove S to a predetermined width or wider, and provide high workability in fastening of the trim strip 45.

Furthermore, the protruding portion 41c has the face 41d away from a deepest end of the insertion groove S, the face being formed to be positioned deeper into the insertion groove as extending toward a protruding end of the protruding portion 41c. Such a feature allows the tip of the securing leg 47 of the trim strip 45 to be guided deeper into the trim strip insertion groove S, when the securing leg 47 is inserted into the trim strip insertion groove S. This contributes to smooth insertion of the securing leg 47.

Moreover, the protruding portion 41c engages with the engaging step portion 47b formed on the securing leg 47 of the trim strip 45. Such a feature effectively reduces the risk that the trim strip 45 comes off the sealing member 30, using the protruding portion 41c for maintaining the width of the opening of the trim strip insertion groove S.

Note that, in the above embodiments, the protruding portion 41c is formed on the side face S1 in the upper portion of the trim strip insertion groove S. Instead of the side face S1 as illustrated in a modification example 1, the side face S2 in the lower portion of the trim strip insertion groove S may be provided with a protruding portion 41e acting as the opening width setting portion. The protruding portion 41e may abut on the side face S1 to maintain the width of the opening of the trim strip insertion groove S. In this case, too, the protruding portion 41e has a face 41f positioned toward the opening (the outside of the compartment) of the trim strip insertion groove S. The face 41f slants to be positioned deeper (the inside of the compartment) into the trim strip insertion groove S, as extending toward a protruding end (upward) of the protruding portion 41e. In this modified example 1, the fitting portion 47a is formed to protrude upward. Moreover, the engaging step portion 47b is provided to the bottom face of the securing leg 47. Furthermore, the side face S1 in the upper portion of the trim strip insertion groove S is provided with a fitting protrusion portion 41g.

Figure 9:
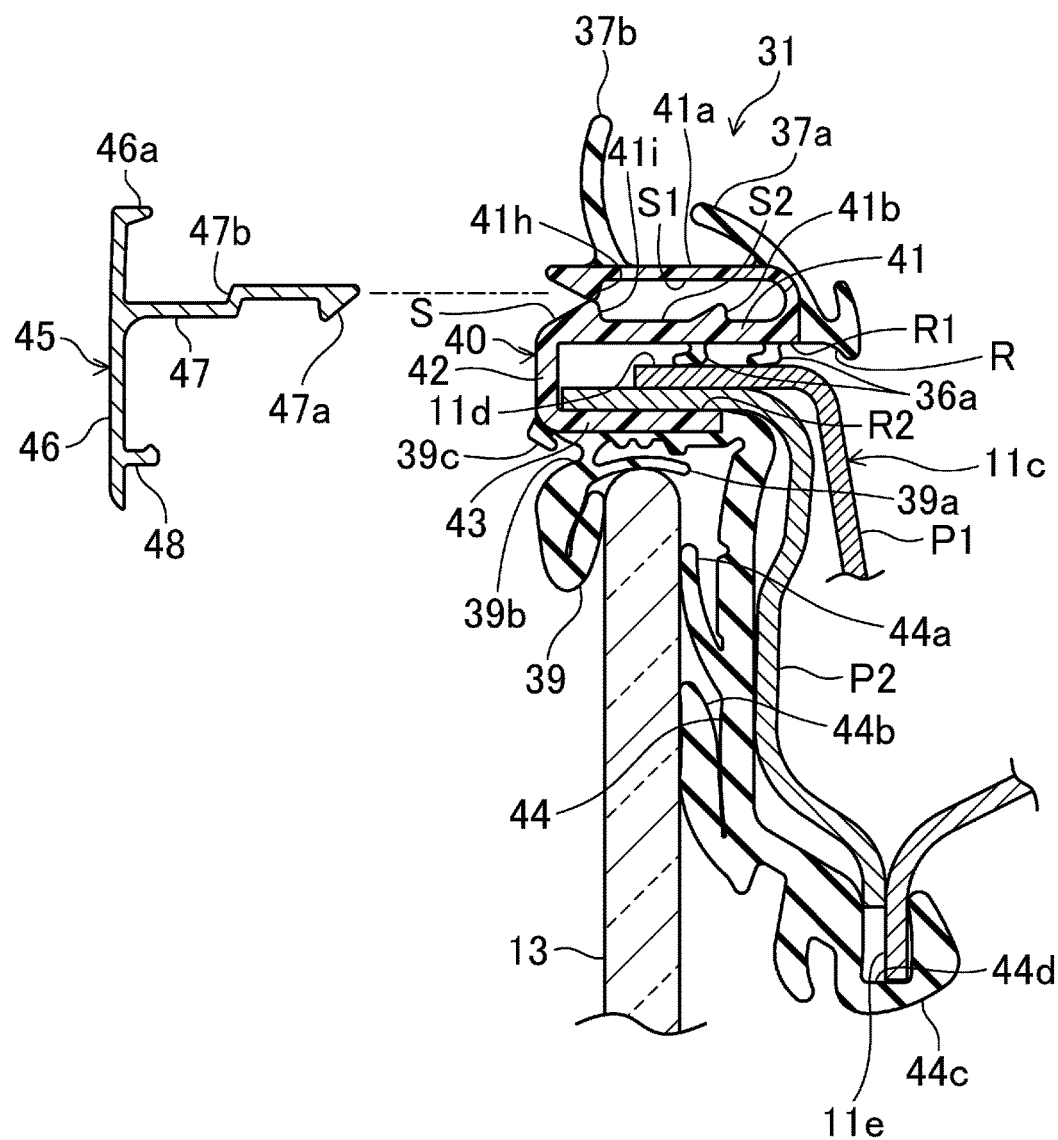
FIG. 9 is an illustration in FIG. 7 according a modified example 2 of the embodiments.

Moreover, as a modified example 2 illustrated in FIG. 9 shows, the side face S1 in the upper portion of the trim strip insertion groove S may be provided with a protruding portion 41h acting as an opening width setting portion. The side face S2 in the lower portion of the trim strip insertion groove S may be provided with a protruding portion 41i acting as an opening width setting portion. The protruding portion 41h provided above abuts on the protruding portion 41i that is a portion of the side face S2 provided below; whereas, the protruding portion 41i provided below abuts on a portion of the side face S1 provided above. Such a feature allows the width of the opening of the trim strip insertion groove S to be set to a predetermined opening width or wider. In this modified example 2, the protruding portion 41h and the protruding portion 41i may guide the securing leg 47 of the trim strip 45 to the widthwise middle of the trim strip insertion groove S.

Moreover, one protruding portion 41c may be formed on each of the side faces S1 and S2 in the upper portion and lower portion of the trim strip insertion groove S.

Furthermore, in the embodiments, the opening width setting portion is provided to the side face S1 of the trim strip insertion groove S. Instead, the opening width setting portion may be formed on at least one of a side face R1 in the upper portion of the door flange insertion groove R or a side face R2 in the lower portion of the door flange insertion groove R, to abut on the other one of the side face R1 or the side face R2 and set the width of the opening of the door flange insertion groove R to a predetermined opening width or wider.

Moreover, the present disclosure may be widely applicable to any structure in which various parts other than the trim strip 45 and the door flange 11d are inserted into an insertion groove formed on the sealing member 30.

The above embodiments are mere examples in all respects, and shall not be limited in interpretation. In addition, all the changes, including the shape, to the equivalents in the claims shall be within the scope of the present disclosure.

As can be seen, the present disclosure may be applicable when a trim strip is secured to a sealing member, or a sealing member is secured to a door flange.

What is claimed is:

1. A sealing assembly to be secured to a door for a car, the sealing assembly comprising:
   a trim strip comprising a securing leg with a protruding tip portion provided with a fitting portion; and
   a sealing member comprising:
      an upper seal edge portion;
      an insertion groove, formed on the sealing member and configured to receive therein at least a portion of the trim strip;
      an opening width setting portion provided to a side face of the insertion groove, protruding toward an other side face of the insertion groove, and abutting on either the other side face prior to receipt of the part in the groove or the part upon receipt of the part in the groove, so as to set a width of an opening of the insertion groove to a predetermined opening width or wider; and
      a core including a top plate portion, a longitudinal plate portion, and a bottom plate portion, wherein protruding portions made of an elastic material are formed on a bottom face of the top plate portion, the protruding portions being configured to flex in contact with a top face of a door flange and clamp the door flange together with the bottom plate portion; and
   wherein:
      a top face of the top plate portion is provided with a fitting protrusion portion positioned deeper into the insertion groove than at least one of the protruding portions of the core;

the securing leg is the portion of the trim strip received in the insertion groove, such that the securing leg, when inserted in the groove, is positioned close to a bottom portion of the groove;

the fitting portion comprises a protruding portion protruding downward from a bottom face of the securing leg, the fitting portion being configured to hook over the fitting protrusion portion of the core so as to engage with the fitting protrusion portion; and the seal member including the upper seal edge portion formed linearly is configured to be forcibly bent to fit into the shape of a bent portion of a frame upper edge portion of a window frame of the door of the car and secured to the window frame.

2. The sealing assembly of claim 1, wherein:
the opening width setting portion has a face extending from an outer end of the opening width setting portion to a protruding end of the opening width portion, and the face is positioned deeper within the insertion groove at the protruding end of the opening width setting portion than at the outer end of the opening width setting portion.

3. The sealing assembly of claim 1, wherein:
the sealing member includes a portion made of an elastic material, and the core is harder than the elastic material, and the core is provided with the opening width setting portion.

4. The sealing assembly of claim 3, wherein the core is formed to fit onto a door flange provided to a window frame of the door while the door flange is inserted into an inserting groove separate from the insertion groove of the sealing member.

5. The sealing assembly of claim 1, wherein:
the sealing member is secured to a door flange, and covering up the door flange at least from an outside of a compartment of the car, the door flange protruding from a window frame of the door toward the outside of the compartment, wherein the insertion groove is formed to open toward the outside of the compartment, and the opening width setting portion engages with an engaging step portion formed on the securing leg of the trim strip.

6. The sealing assembly member of claim 5, wherein: the fitting protrusion portion engages a groove formed on the securing leg of the trim strip.

7. The sealing assembly of claim 1, wherein:
the trim strip further comprises a securing claw spaced downward and apart from the securing leg;

a tip of the securing claw is located toward the outside of the compartment with respect to an exterior face of window glass in the window frame;

the sealing member further comprises a glass contacting portion extending downward from the core and making contact with the exterior face of the window glass; and the glass contacting portion includes a claw-receiving recessed portion configured to receive the securing claw of the trim strip.

\* \* \* \* \*